March 9, 1926.  1,575,818
W. H. CARRIER
REFRIGERATING SYSTEM AND METHOD OF REFRIGERATION
Filed April 5, 1921  9 Sheets-Sheet 1

March 9, 1926.  1,575,818
W. H. CARRIER
REFRIGERATING SYSTEM AND METHOD OF REFRIGERATION
Filed April 5, 1921    9 Sheets-Sheet 2

March 9, 1926.  1,575,818
W. H. CARRIER
REFRIGERATING SYSTEM AND METHOD OF REFRIGERATION
Filed April 5, 1921  9 Sheets-Sheet 3
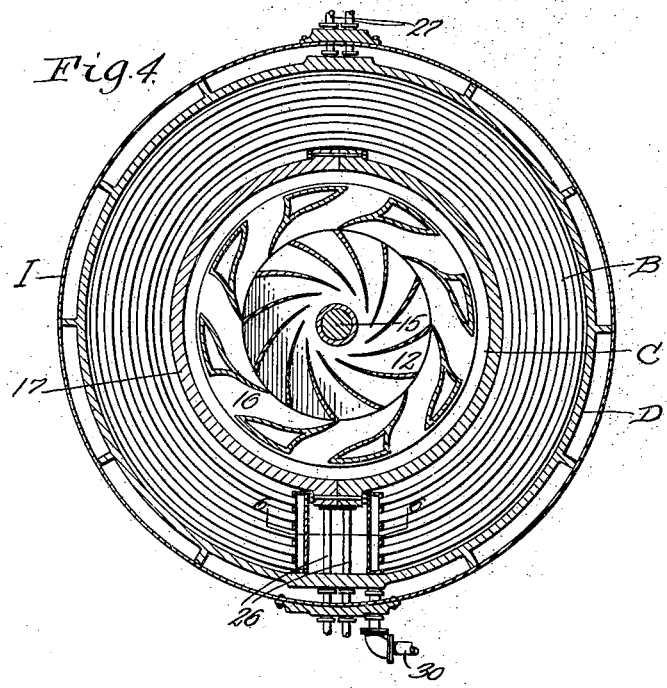
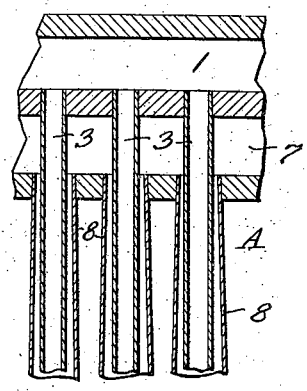
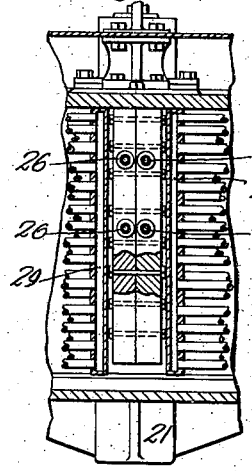
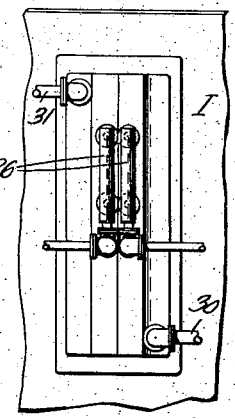
Inventor
Willis H. Carrier
by Parker & Prochnow
Attorneys

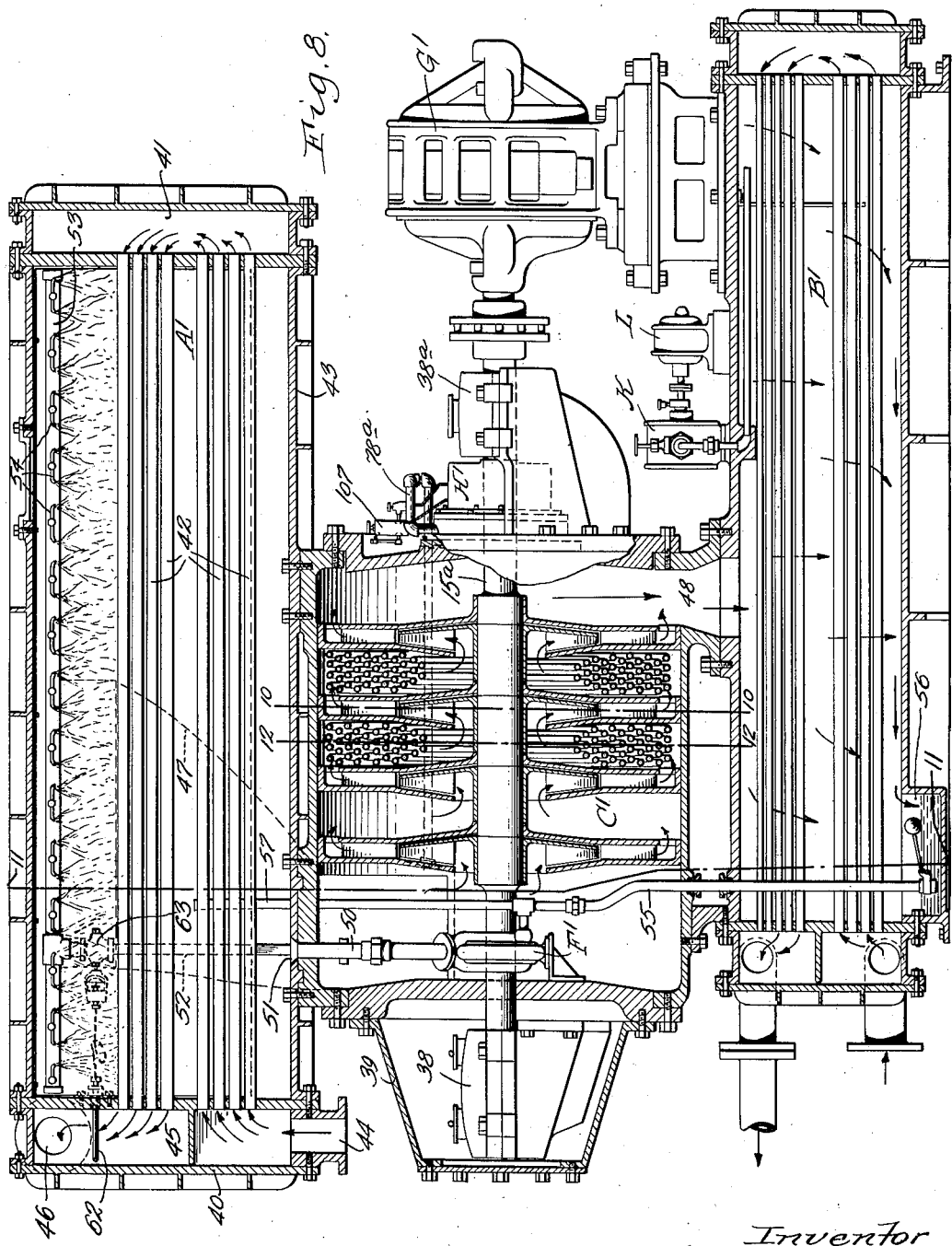

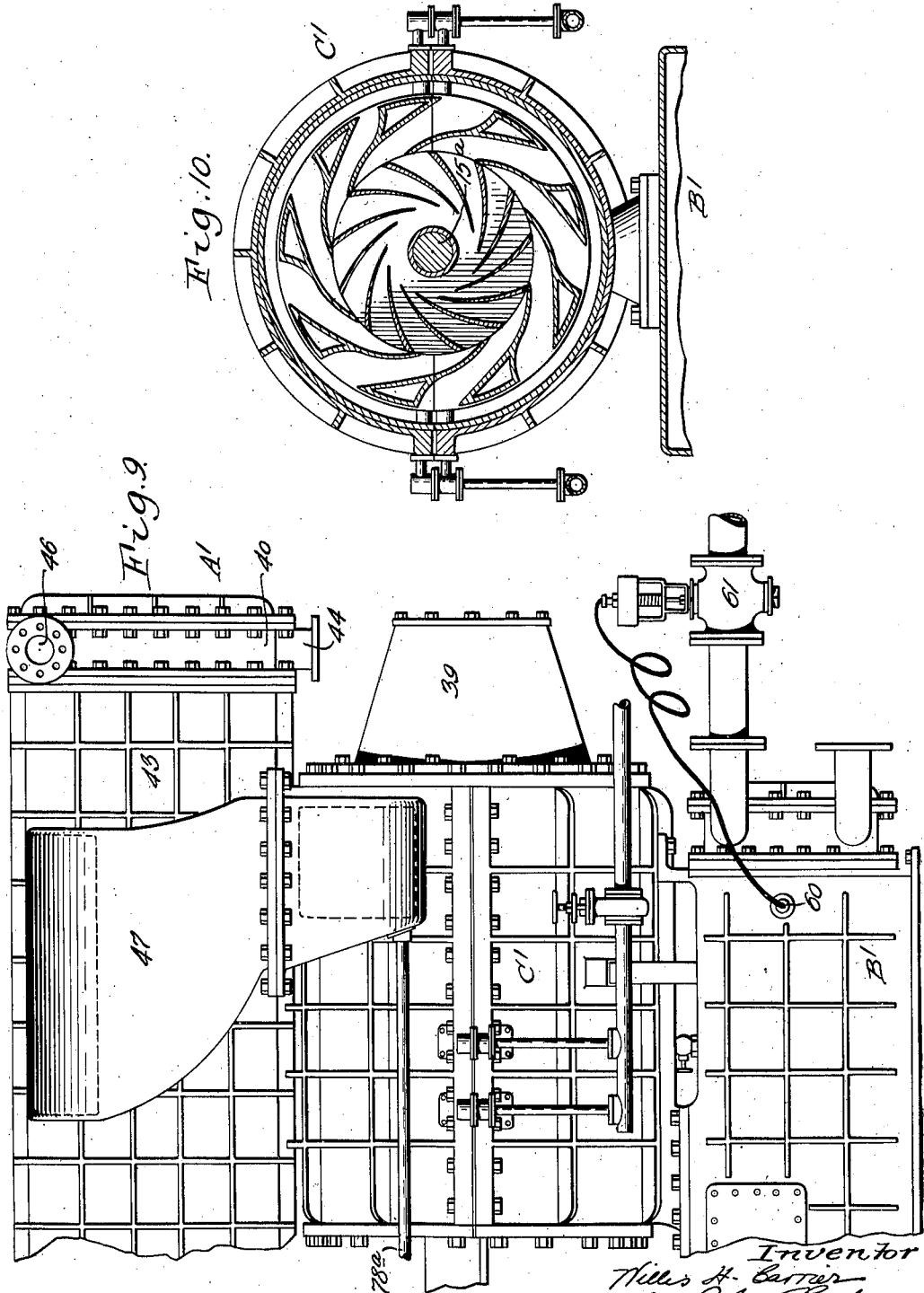

March 9, 1926.
W. H. CARRIER
1,575,818
REFRIGERATING SYSTEM AND METHOD OF REFRIGERATION
Filed April 5, 1921    9 Sheets-Sheet 6
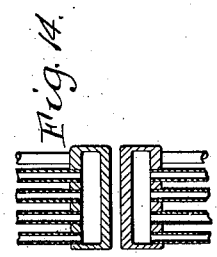
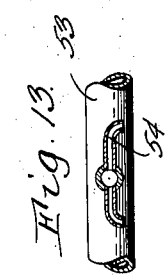
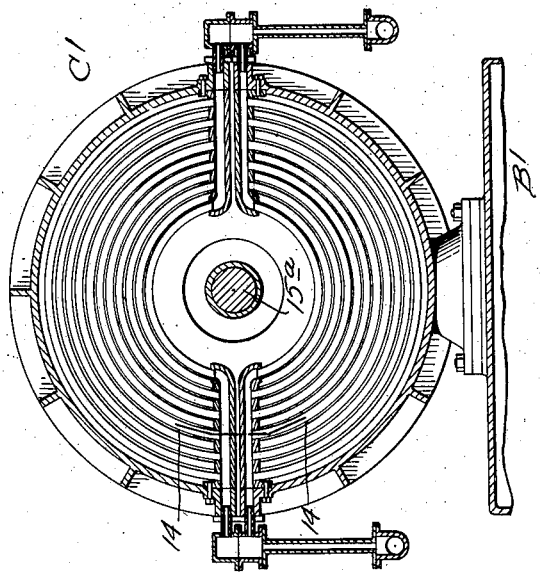
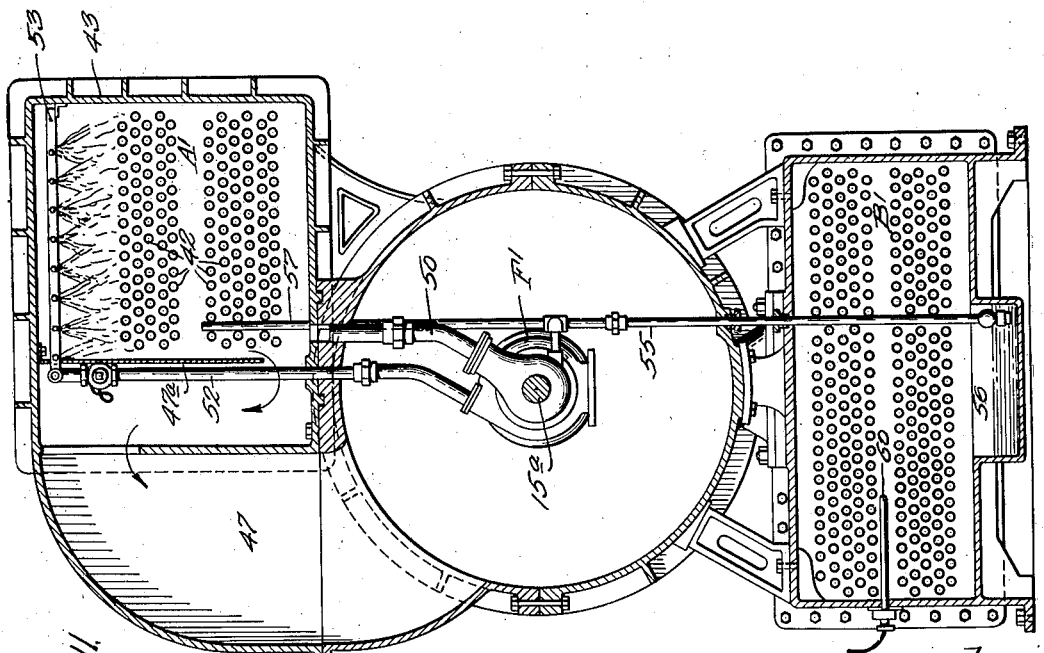

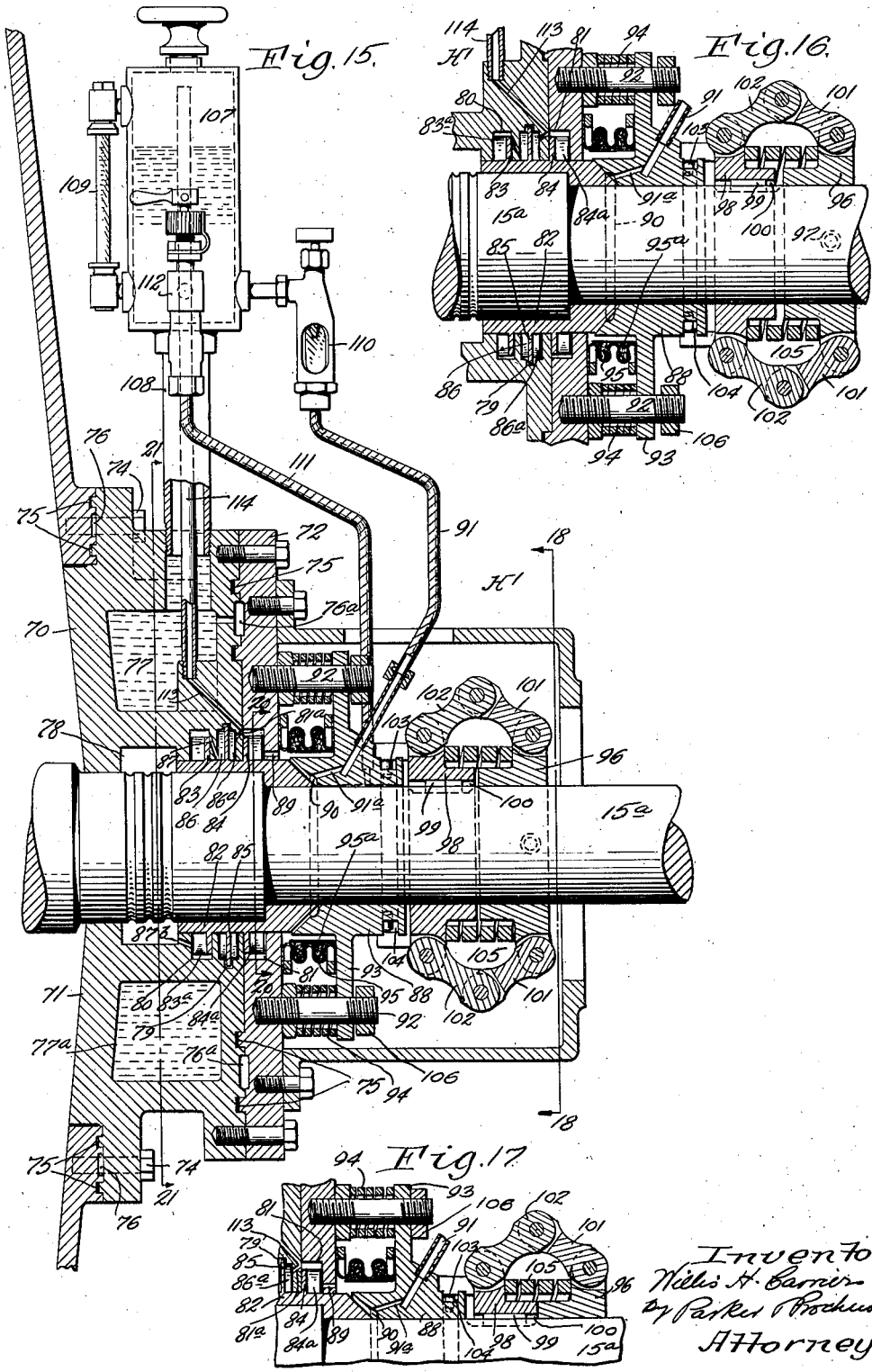

March 9, 1926.
W. H. CARRIER
1,575,818
REFRIGERATING SYSTEM AND METHOD OF REFRIGERATION
Filed April 5, 1921     9 Sheets-Sheet 8
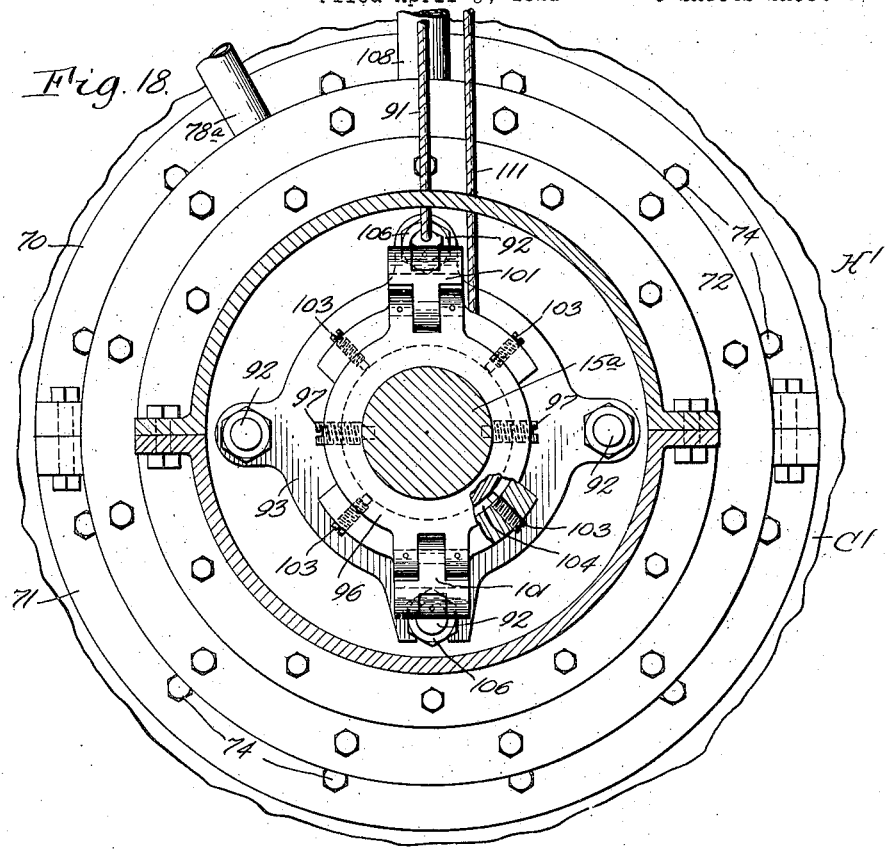
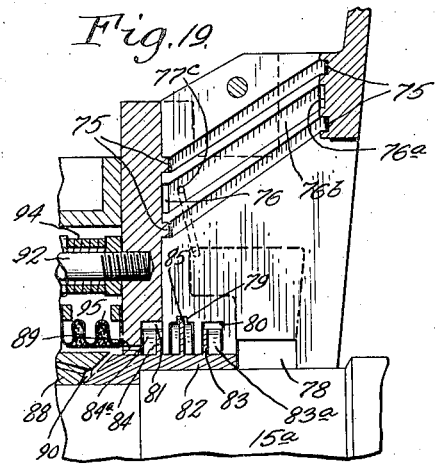
Inventor
Willis H. Carrier
by Parker & Prochund
Attorneys March 9, 1926. 1,575,818
W. H. CARRIER
REFRIGERATING SYSTEM AND METHOD OF REFRIGERATION
Filed April 5, 1921 9 Sheets-Sheet 9

Inventor
Willis H. Carrier
by Parker Brockwow.
Attorneys

Patented Mar. 9, 1926.

1,575,818

UNITED STATES PATENT OFFICE.

WILLIS H. CARRIER, OF NEW YORK, N. Y., ASSIGNOR TO CARRIER ENGINEERING CORPORATION, OF NEW YORK, N. Y.

REFRIGERATING SYSTEM AND METHOD OF REFRIGERATION.

Application filed April 5, 1921. Serial No. 458,679.

*To all whom it may concern:*

Be it known that I, WILLIS H. CARRIER, a citizen of the United States, residing at New York, in the county of New York and State of New York, have invented a new and useful Improvement in Refrigerating Systems and Methods of Refrigeration, of which the following is a specification.

This invention relates to refrigerating systems of the compression type in which a volatile refrigerant liquid is boiled or evaporated in an evaporator by the heat abstracted from the substance being cooled, and the vapor of the refrigerant is withdrawn from the evaporator and delivered by a compressor at a higher pressure to a condenser in which the vapor is condensed, after which the liquefied refrigerant is returned to the evaporator. The invention is especially applicable to refrigerating systems of this type which are used for cooling water, brine or other liquid, which in turn is to be used for the cooling and dehumidifying of air, the cooling of rooms or for manufacturing ice, for all of which purposes, a constant temperature of the cooling liquid is desirable, and which is obtained by this invention.

It is quite evident to those familiar with the art of refrigeration that it would be a great improvement if the present ponderous reciprocating ammonia compressors, operating at high pressures, could be replaced by machines such as a centrifugal fan, exhauster or pump, which would handle relatively large volumes of gas at low pressures and also at low differences of pressure. But the engineering problems incident to a refrigerating system using such centrifugal machines have heretofore prevented the adoption of such systems.

One of the primary objects of this invention is to overcome these obstacles and secure these advantages by producing a practical and efficient refrigerating system in which a centrifugal fan, compressor or exhauster is employed for creating a vacuum in the evaporator where a liquid, such as water or brine is to be cooled, and delivering the refrigerant vapor to the condenser at a higher pressure corresponding to the vapor pressure of the refrigerant at approximately the temperature of the condensing water or medium used in the condenser.

The first advantage secured by such a system is mechanical. In a centrifugal compressor there are no valves, and there are no rubbing parts within the machine itself, conditions being exactly identical in this respect as in a steam turbine. The only points where friction could occur are in the bearings and in the stuffing box. I, however, eliminate friction in the stuffing box by the provision in this system, of a stuffing box of novel construction; and objectionable friction in the bearings is avoided by the use of bearings such as are used for motors. The centrifugal compressor can be direct connected to a high speed motor or turbine, which is the modern preferred method of drive wherever possible. Such a drive requires a minimum of attention and has the great advantage of simplicity.

The second great advantage in the use of a centrifugal compressor is its flexibility in capacity to variations in demand or load. Centrifugal compressors have a certain operating pressure which is usually close to the maximum pressure which they are capable of producing. They are completely flexible and non-positive; the discharge or inlet can be closed without any excessive pressure being produced or any increase in the driving power, in fact, the power required for driving the compressor decreases when the discharge or inlet is closed, to a small fraction of the working power required. The capacity of the machine increases or decreases with the demand up to and slightly beyond the normal, full load with but slight change in pressure differences, which means but slight change in the ratio of absolute temperatures between the evaporator or cooler and the condenser through a considerable range. In other words, if, for example, a substantially constant condenser temperature is maintained, the temperature of the evaporator on the suction side of the fan will also remain substantially constant. The power load will also decrease automatically with the capacity and therefore with the demand. This is quite a contrast with the operation of the positive compressors or piston pumps which have heretofore been employed in refrigeration. In these the pressure difference builds up until the full rating of the compressor is secured. In other words, the capacity does not vary but the terminal pressures do vary in the positive compressors. Under the majority of conditions of operation, this is a great disadvantage.

Another object of the invention is to maintain a constant temperature in the cooler and avoid the freezing of the brine, water or other liquid being cooled; and to do this without necessitating any speed changing devices for varying the speed of the compressor. Whenever there is an increase or decrease in demand for cooling, this is accomplished by increasing or decreasing the amount of liquid to be cooled that is passed through the cooler or evaporator, which gives an instantaneous responsive control and permits the refrigerating equipment always to operate at maximum efficiency.

The first problem precedent to the practical attainment of the desired results above indicated is the selection of a suitable volatile refrigerant. It is practically necessary to use a refrigerant which has low vapor pressures and that operates under a vacuum, or below atmospheric pressure in the evaporator or cooler with temperatures as high as 40° F. or 50° F.; and the refrigerant should be one whose vapor has a high specific density, in order that the compression may be easily produced by centrifugal force, since the differential pressure produced by a centrifugal compressor is in direct proportion to the density of the gas handled. Refrigerants which are suitable from the standpoint of specific density and low or moderate pressures are ethyl chloride, carbon tetrachloride and sulphur dioxide. Of these ethyl chloride and carbon tetrachloride are the most suitable. Both of these substances are inert and do not attack metals. The refrigerant should also have relatively large vapor volumes in order that a centrifugal machine may operate efficiently. About the smallest capacity of centrifugal machine which will handle gases efficiently at the required pressures and the maximum speeds of approximately 3400 R. P. M., as limited by the speed of induction motors, is between 1000 and 1500 cubic feet per minute inlet capacity. With ethyl chloride this would mean a minimum refrigerating unit having a capacity in the neighborhood of 75 to 100 tons. Carbon tetrachloride however, working under high vacuums will give a relatively large volume displacement with low pressure difference, and refrigerating units as small as about 10 tons capacity can be made to operate economically. Carbon tetrachloride has a density which is five and one-half times as great as air. It is non-explosive and non-inflammable. Its use in my refrigerating system is absolutely safe because when this substance is used, all parts of the system including the evaporator, exhauster and condenser are under a vacuum, so that there is no chance for the escape of the gas. The liquid itself can be handled almost like water under atmospheric pressures, and is entirely harmless. On this account carbon tetrachloride is especially well adapted for marine work, air conditioning work in public buildings, or wherever there would be danger from escape of ammonia fumes or of an inflammable vapor. It is also comparatively cheap and easily obtainable. For these reasons this substance is preferred for all systems having a capacity under 100 tons, and for marine work, public buildings, etc. For manufacturing plants, ice plants, cold storage houses, etc., where the unit requirements are 100 tons or more, ethyl chloride is preferred. When using this substance, the system operates under a vacuum on the suction side, but at a slight pressure on the condenser.

The second problem arises from the use of low pressure refrigerants as contrasted with the present practice of using high pressure refrigerants. With high pressure refrigerants the head of liquid is of slight importance as affecting the boiling point, whereas with a low pressure refrigerant it is of great importance that the cooling surfaces shall not be submerged at any time under any head of liquid which can substantially change the boiling point. For example, with ammonia, 90° difference in temperature produces a difference in pressure in the neighborhood of 160 to 170 pounds, or about one-half degree per pound, while with ethyl chloride the same difference in temperature produces a difference in pressure of about 25 pounds of three and one-half degrees per pound, and with carbon tetrachloride the same difference in temperature produces only about three and one-half pounds difference in pressure or about twenty-five degrees per pound.

Therefore, when a low pressure refrigerant, such as carbon tetrachloride is used, a new type of evaporator is preferably employed, in which the refrigerant is showered or caused to flow in a thin film over the evaporating tubes or surfaces so that at no time are they submerged under any head of liquid and there is merely a surface evaporation with a very large area of surface exposed.

The volume of refrigerant handled is many times that acutually evaporated, the liquid being simply circulated over and over. Evaporators of two different constructions suitably for the purpose are hereinafter described. An advantage in connection with a surface evaporator of this sort is that the supply of liquid flowing over the evaporating surfaces can be readily controlled by a thermostatic valve so as to limit the amount of refrigeration to obtain any desired temperature in the cooler, the centrifugal compressor cooperating to reduce its capacity and power consumption in the manner hereinbefore described. A further advantage is that a very small total volume of refrigerant liquid is required, just sufficient to fill the circulating system, so that any danger in case of fire or explosion is practically eliminated. The tubes or heat interchanging parts of the evaporator in this system can be made of metals of high conductivity, such as brass or aluminum, which give a rate of conductivity many times greater than is possible in machines of the kind now in use. In the system herein described, any danger of freezing the water or brine is positively prevented, which makes the flooded type of cooler either impracticable or undesirable in previous systems.

The third problem is the necessity for a stuffing box for the compressor that will be substantially frictionless notwithstanding the high speed of the rotary compressor, will seal perfectly against any necessary vacuum or against any moderate pressure up to atmospheric pressure or more while the machine is running, and will also effectually prevent any escape of the refrigerant vapor and any ingress of air when the rotation of the compressor is stopped. A further requirement is that the sealing liquid of the stuffing box must be prevented from leaking anywhere into the compressor, since if it does, it will cause mechanical trouble and contamination of the refrigerant. The stuffing box hereinafter described fulfills these requirements.

The results sought by this invention are capable of attainment by apparatus of different constructions. The accompanying drawings disclose two such different embodiments of the invention by which the difficulties above mentioned are overcome and the stated advantages and objects of the invention secured.

In the accompanying drawings:—

Fig. 1 is a sectional elevation of a vertical refrigerating machine embodying the invention.

Figs. 2, 3 and 4 are sectional plan views thereof on lines 2—2, 3—3 and 4—4, respectively, Fig. 1.

Fig. 5 is an enlarged fragmentary section of the upper portion of the evaporator.

Fig. 6 is a sectional elevation of the machine on line 6—6, Fig. 4.

Fig. 7 is a fragmentary elevation of the headers for the condenser.

Fig. 8 is a sectional elevation of a horizontal refrigerating machine embodying the invention.

Fig. 9 is a fragmentary side elevation thereof.

Figs. 10, 11 and 12 are transverse sectional elevations thereof on lines 10—10, 11—11 and 12—12, respectively, Fig. 8.

Fig. 13 is an enlarged section of the spray head of the evaporator.

Fig. 14 is an enlarged section on line 14—14, Fig. 12.

Fig. 15 is a sectional elevation on an enlarged scale of the stuffing box for the horizontal machine.

Figs. 16 and 17 are fragmentary sections thereof showing respectively the closed and open positions of the stuffing box valve.

Fig. 18 is a transverse sectional elevation thereof on line 18—18, Fig. 15.

Figure 1:
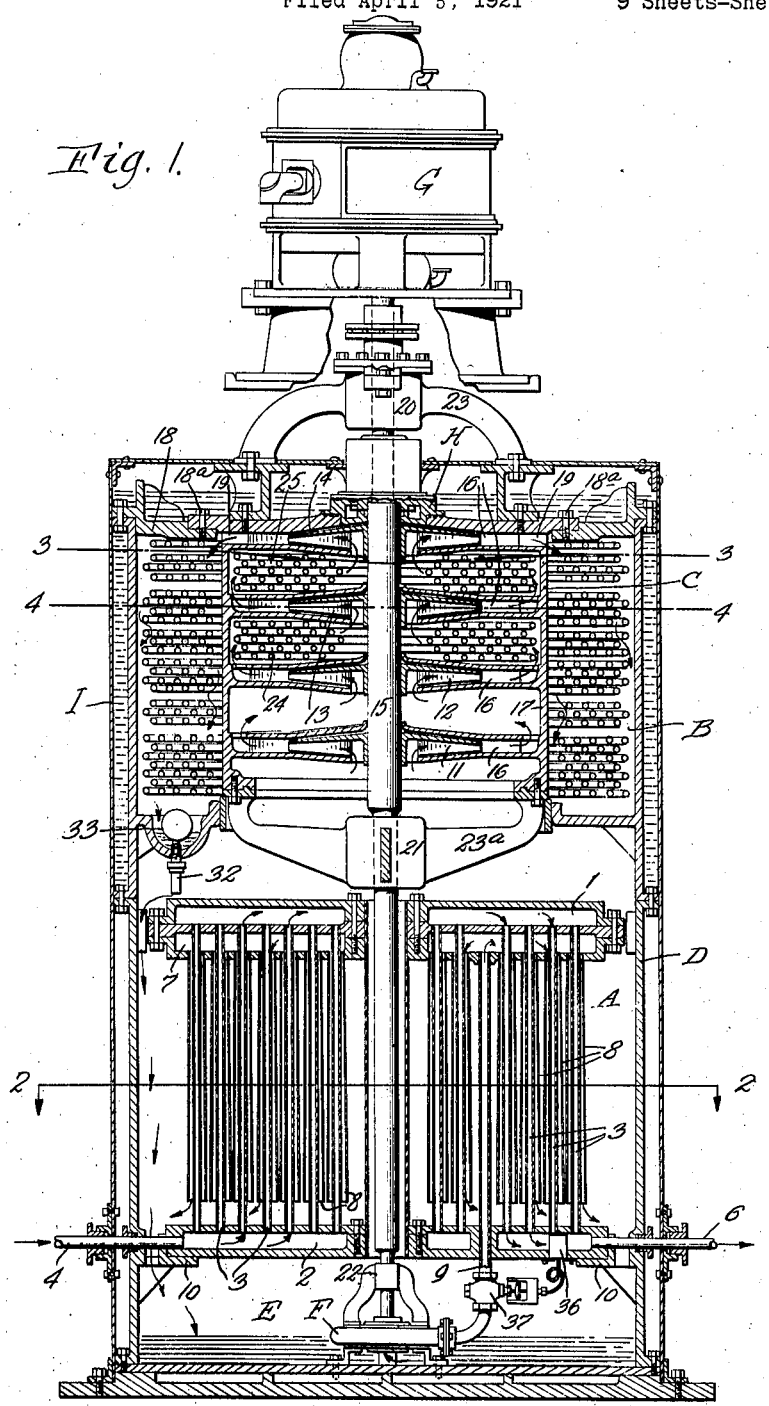
Figure 2:
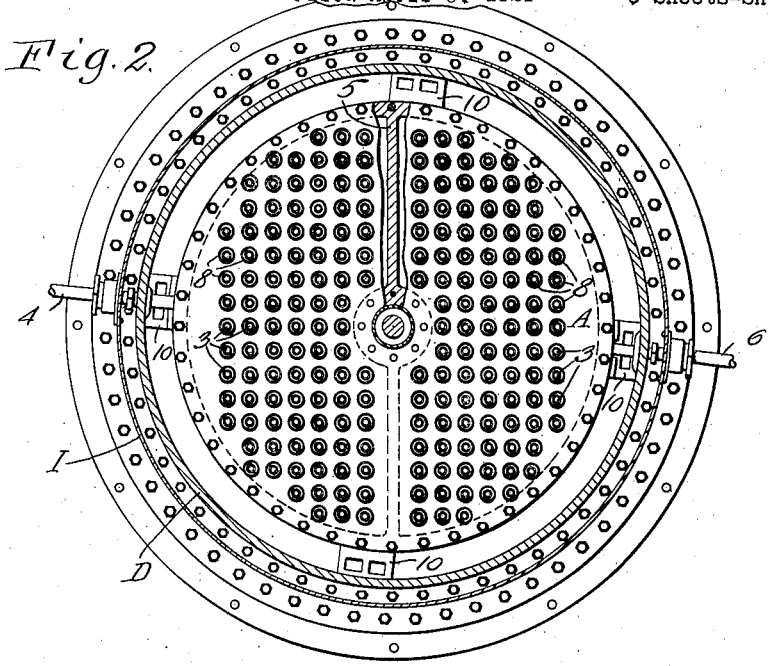
Figure 3:
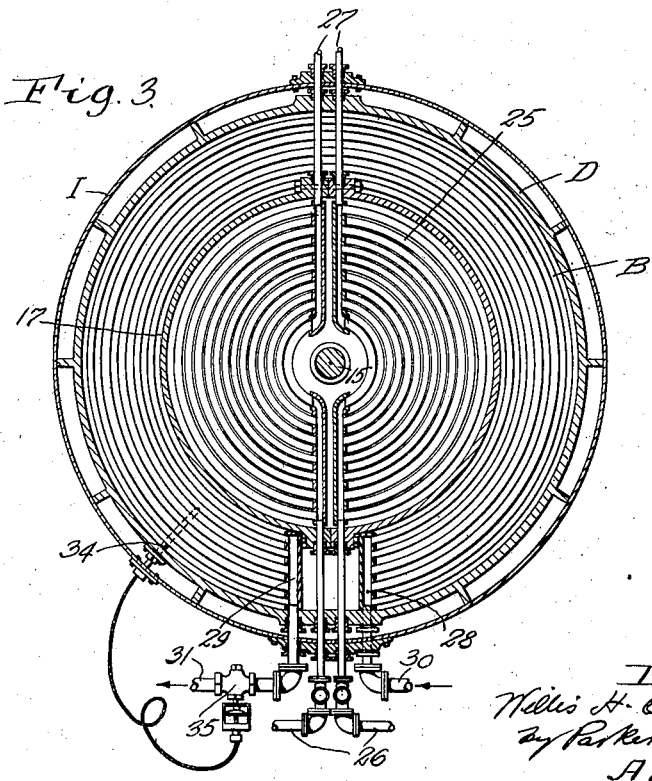
Figure 21:
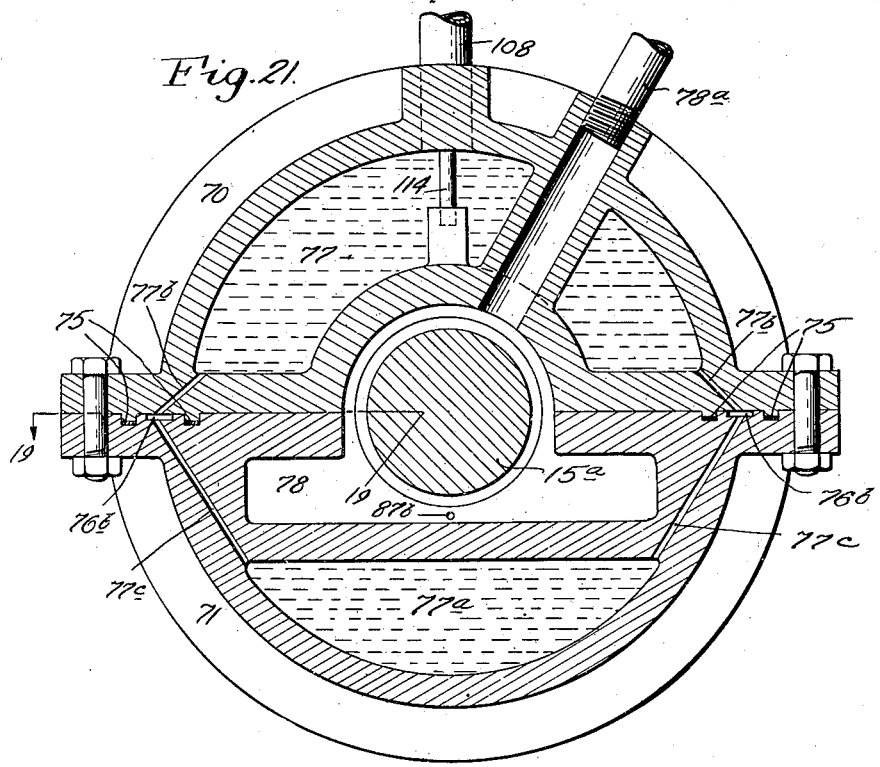

Fig. 19 is a sectional plan view thereof on line 19—19, Fig. 21.

Fig. 20 is a vertical section thereof on line 20—20, Fig. 15.

Fig. 21 is a vertical section thereof on line 21—21, Fig. 15.

Figure 22:
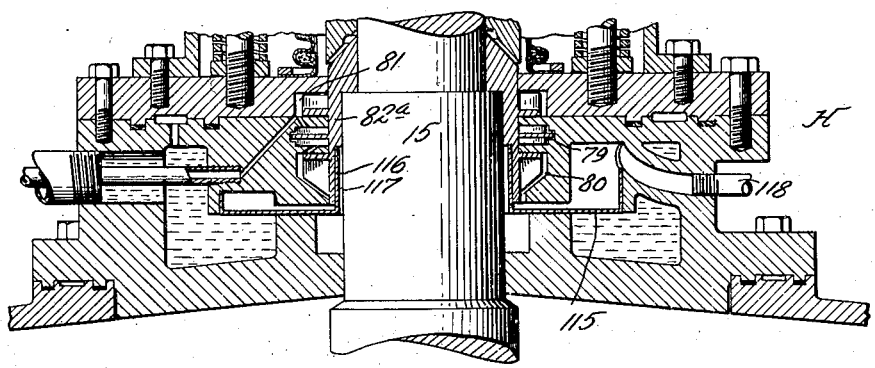

Fig. 22 is a sectional elevation of the lower end of the stuffing box as changed for use on a vertical compressor.

Referring first to the vertical machine shown in Figs. 1–7, A represents the evaporator or cooler, B the condenser and C the centrifugal fan, compressor or exhauster, which exhausts the vaporized refrigerant from the evaporator and delivers it at a higher pressure to the condenser. These parts are arranged in a stationary, upright, cylindrical casing D, preferably as shown, with the compressor arranged above the evaporator to rotate about a vertical axis, and the condenser being of annular form surrounding the compressor.

The evaporator A, as shown in this machine, is constructed as follows:

1 and 2 represent respectively upper and lower hollow chambers or heads which are connected by a multiplicity of vertical tubes 3 for the flow of water, brine or other liquid to be cooled. This liquid enters the lower head 2 through a supply pipe 4, flows upwardly through the tubes 3 located at one side of a transverse partition 5 in the lower head, passes thence through the upper head 1, down through the remaining tubes 3 and out through a discharge pipe 6. 7 represents a hollow head or chamber located just beneath the upper head 1 and through which the tubes 3 pass. Tubes 8 are connected at their upper ends with and depend from the head 7, each tube 8 surrounding one of the tubes 3 and being open at its lower end. The tubes preferably taper, increasing slightly and gradually in diameter downwardly. A collecting chamber E for the refrigerant liquid is provided in the casing D below the evaporator. The refrigerant liquid is delivered from this chamber by a pump F through a discharge pipe 9 to the head 7 and flows downwardly from this head in thin films on the inner tubes 3 within the tapering tubes 8. Any refrigerant liquid discharging from the open, lower ends of the outer tubes flows back into the collecting chamber E around the edges of the lower head 2 of the evaporator, the periphery of which is spaced from the vertical walls of the casing D. The evaporator can be supported in the casing D in any suitable manner, as for instance on brackets 10 projecting inwardly from the vertical walls of the casing D.

A multiple stage centrifugal fan or compressor of any suitable type is preferably used, consisting of a plurality of rotors 11, 12, 13 and 14, of which any desired number may be employed, depending upon the pressure required. These rotors are secured to a vertical shaft 15 extending centrally through the machine and each rotates in a compartment 16. These compartments are preferably formed in a compressor casing or shell 17 which is arranged centrally in the stationary casing D and is preferably suspended therein from the annular top or flange 18 of the casing in such a way that the fan or compressor can be inserted and removed through a central opening in the top of the casing D and stationary but removably secured in place therein as by bolts 18ª securing a projecting flange on the top of the fan casing to the annular top flange 18 of the stationary casing D. The fan or compressor operates in the usual manner, the vapor entering the central portion of the first rotor 11 and being delivered through the discharge openings of the compartment 16 for this rotor, thence passing similarly through the successive rotors and compartments and being finally delivered from the last compartment 16 through suitable discharge openings 19 in the fan casing 17 into the surrounding, annular condenser B. The compressor shaft 15 is journalled in suitable bearings 20 and 21 at the upper and lower ends of the compressor, and the shaft, which extends downwardly through a central opening in the evaporator A, may be stepped in a suitable bearing 22 in the bottom of the machine casing D. The upper and lower bearings 20 and 21 are preferably carried by spiders or supports 23 and 23ª secured respectively to the upper and lower ends of the compressor casing, the support 23ª for the lower bearing 21 being formed so that it can be removed with the fan casing when the latter is removed from the stationary casing D.

24 and 25 indicate cooling coils which are arranged between the second and third, and third and fourth stages of the compressor for reducing the rise in temperature of the vapor in the compressor, due to compression. These cooling coils may be circular cooling coils of ordinary construction connected to supply and discharge pipes 26 and 27, for water or any other suitable cooling medium.

The compressor is driven by an electric or other suitable motor G, suitably mounted on top of the stationary casing and having its shaft suitably coupled to the upper end of the compressor shaft 15.

The pump F for the liquid refrigerant is preferably arranged horizontally in the collecting chamber E in the bottom of the stationary casing with its rotor connected directly to the lower end of the compressor shaft 15.

The condenser B is preferably formed by circular coils of pipe surrounding the compressor casing in the stationary casing, and connected at their opposite ends to suitable headers 28 and 29, with which connect supply and discharge pipes 30 and 31 for the water or other condensing medium.

In the operation of the machine, the liquid refrigerant is delivered from the collecting chamber E in the bottom of the stationary casing by the pump F, through the discharge pipe 9 to the head 7 of the evaporator and flows down between the inner tubes 3 and outer tubes 8 of the evaporator, being vaporized by the heat abstracted from the liquid to be cooled which flows through the inner tubes 3. Any of the liquid refrigerant which is not evaporated flows back into the collecting chamber E, while the refrigerant vapor escaping from the lower ends of the outer tubes 8 is withdrawn from the lower portion of the casing D in which the evaporator is located and is delivered by the fan or compressor at a higher pressure into the condenser B. The vapor is condensed by contact with the cooling tubes of the condenser and the liquefied refrigerant discharges from the bottom of the condenser by gravity and by difference in pressure and flows back into the collecting chamber E preferably through a discharge pipe 32 controlled by a float-operated valve or trap 33 which closes and stops the discharge when the liquid lowers to a predetermined low level, so as to thus form a liquid seal or trap and prevent vapor from being exhausted from the condenser. The downwardly enlarging outer tubes 8 of the evaporator reduce the pressure on the liquid and allow free evaporation of the refrigerant. With the refrigerant liquids of low vapor pressure used in this machine, it is important that the pressure on the evaporating surfaces shall be practically the same as that corresponding to the temperature of the liquid. That is, there should be no additional pressure imposed upon the evaporating surfaces, as in the case of submerged tubes or surfaces. This result is accomplished by using the downwardly enlarging or diverging outer tubes 8.

H represents the stuffing box for preventing the escape of vapor or the loss of vacuum from the compressor casing, or the ingress of air to the compressor casing through the opening for the compressor shaft 15. The construction and operation of this stuffing box is hereinafter described.

I represents an outer casing or jacket surrounding and extending above the top of the stationary casing D. This jacket is preferably filled to a level above the top of the stationary casing D, with a suitable sealing liquid to prevent possible leakage of vapor out of or air into the machine through the joints between the parts thereof.

The temperature of the liquid being cooled in the evaporator A can be kept substantially constant and the liquid prevented from freezing or going below the desired point, for example, in the case of water, below 34° F. or 35° F. in a very simple and efficient way by means of a thermostat which is responsive to the condenser temperature and controls the supply of cooling liquid to the condenser. For this purpose, in the construction shown, a vapor pressure thermostat 34 is located in the condenser and is operatively connected to a thermostatic valve 35 in the water discharge pipe 31 of the condenser. If the water to the condenser is shut off or reduced, this raises the terminal pressure slightly and correspondingly raises the temperature of evaporation in the evaporator or cooler. This control of the final or outgoing temperature of the condensing water, since it maintains a constant condenser temperature and pressure, tends to prevent the danger of an overload of the centrifugal compressor when the entering or initial temperature of the condensing water is low. With the low condenser temperature and pressure the difference in pressure between the cooler and the condenser is reduced and hence with a centrifugal compressor the capacity and horse power are correspondingly increased which may cause a serious overload in the case of electric drive. This is largely prevented by the control as described. Thus since a substantially constant ratio of absolute pressures in the evaporator and condenser is kept through a considerable range with a constant pressure centrifugal fan, therefore, by maintaining a substantially constant condenser temperature, a substantially constant and definite pressure and temperature is maintained in the evaporator or cooler. This prevents freezing in the evaporator in the event that an abnormally small quantity of the liquid being cooled is circulated.

Another very simple method of control is to regulate the supply of refrigerant liquid to the evaporator, which can be conveniently accomplished in a similar manner by a thermostat 36 responsive to the temperature of the liquid being cooled, and operatively connected to a thermostatic valve 37 in the discharge pipe 9 of the refrigerant circulating pipe. This valve is adapted to be closed by its spring when the temperature of the liquid being cooled goes below the desired, predetermined temperature for which the thermostat is set, and the valve is opened to permit the passage of the refrigerant liquid to the evaporator, by the pressure of the vapor in the thermostat when the temperature of the liquid being cooled rises above a predetermined limit. The control varies the load in accordance with the amount of evaporation permitted and the degree of cooling accomplished in the evaporator or cooler, which is important from the standpoint of preventing overcooling of such liquids as water, so as to avoid danger of freezing. It has the mechanical advantage of being a very simple and foolproof control in the nature of a thermostatic trap, working against low pressures and not requiring an especially close fitting or tight closing valve.

A desirable feature in connection with this method of applying the refrigerant for cooling surfaces is that it is a very simple matter to put in the thermostatic control which will shut off the supply of refrigerant to the cooling surfaces and thus limit the amount of refrigeration to obtain any desired temperature in the evaporator or cooler, the centrifugal compressor cooperating to reduce the capacity and power consumption in the manner explained. It also has the advantage that when the compressor is shut down, practically all further refrigerating ceases, because there is no considerable body of liquid present to evaporate further. A further advantage is the small total volume of refrigerant required.

Controls of the type described are only possible in a non-positive refrigerating system, such as described, in which a centrifugal or non-positive exhauster, fan or compressor is used, giving substantially uniform differences of pressure. With either control the power decreases automatically with the load, and without necessitating any speed changing devices, such as are required with the positive compressors or vacuum pumps.

While both of the described thermostatic controls are preferably used and cooperate in the control of the system, either control can be used without the other and give good results.

Referring now to the horizontal machine shown in Figs. 8–21, A' represents the evaporator or cooler, B' the condenser and C' the centrifugal fan, compressor or exhauster. In this horizontal machine the condenser is arranged horizontally at the lower portion of the machine and serves as a supporting base for the other parts of the machine. The fan or compressor C' is arranged horizontally, that is, it rotates about a horizontal axis, and the casing thereof is mounted on the condenser B' while the evaporator or cooler A' is mounted on top of the fan or compressor casing.

The centrifugal fan or compressor is constructed and operates substantially as above described except that it is arranged horizontally. G' is the motor for driving the fan or compressor. This motor is preferably mounted on and supported by the casing of the condenser and its shaft is suitably coupled to the outer end of the compressor shaft $15^a$. This shaft, as shown, is journalled at opposite ends in suitable bearings 38 and $38^a$ mounted on opposite ends of the compressor casing. The bearing 38 and the end of the shaft journalled therein are enclosed within a housing 39 secured by a gas tight joint to the adjacent end of the compressor casing so that there is no possibility of leakage through the opening around the compressor shaft at this end of the compressor. Leakage from or into the compressor casing at its opposite end, where it is necessary for the shaft to be exposed for connection with the driving motor is prevented by a stuffing box H', constructed as hereinafter described.

In the horizontal machine the evaporator or cooler A' consists of opposite heads 40 and 41 connected by horizontal flow tubes 42 which are enclosed within a casing 43 connecting the two heads 40 and 41. The liquid to be cooled is admitted to the head 40 through a supply connection 44 and flows through the tubes 42 at one side of a transverse partition 45 in the head 40 and thence passes through the head 41 and remaining tubes back to the head 40 from which it discharges through a discharge pipe or connection 46. In this evaporator or cooler the refrigerant liquid is showered or sprayed in the upper part of the evaporating casing above the tubes 42 so as to flow downwardly in a thin film over the surfaces of the tubes, and the refrigerant vaporized in the evaporator is withdrawn therefrom by the centrifugal fan or compressor through a suitable inlet duct 47 connecting the evaporator casing with the compressor casing. The vaporized refrigerant is separated from the liquid spray and the liquid spray prevented from being withdrawn with the vapor from the evaporator by suitable means, such as a baffle or partition $47^a$ in the evaporator casing between the flow tubes and the vapor exhaust connection. The compressed vapor is delivered by the fan or compressor through a suitable opening or duct 48 into the condenser B'.

F' represents the circulating pump for the refrigerant liquid. This pump is preferably located as shown, in the compressor casing with its rotor secured directly to the shaft $15^a$ of the fan or compressor. The suction pipe 50 of this pump leads from a depressed portion 51 of the bottom of the evaporator casing and the discharge pipe 52 of the pump extends upwardly into the evaporator casing and is connected at its upper end to a manifold or header having pipes 53 which extend horizontally in the upper part of the evaporator casing and are provided with a multiplicity of spray nozzles 54 for spraying or showering the refrigerant liquid uniformly over the tubes of the evaporator. 55 is a suction pipe leading from a collecting well 56 in the bottom of the condenser casing to the suction connection of the pump F' so that the pump also operates to return the refrigerant liquid collecting in the condenser to the spray heads in the evaporator. This pipe 56 is preferably provided with a branch 57 extending upwardly into the evaporator for the purpose of discharging any surplus refrigerant into the evaporator.

K represents a small vacuum pump or exhauster connected with the condenser B' for exhausting air from the system when starting the machine. This pump is preferably mounted on the condenser casing and driven by a suitable, small motor L.

The operation of this machine can be automatically regulated and the temperature of the liquid being cooled regulated by thermostatic controls similar to those described in connection with the vertical machine. 60 represents the thermostat controlling the final temperature of the condenser by means of a thermostatic valve 61 in the water discharge pipe, and 62 represents the thermostat controlling the temperature of the water being cooled by means of a thermostatic valve 63 regulating the supply of refrigerant to the evaporator or cooler.

The refrigerating systems herein described are adapted for producing or exhausting a vacuum in the evaporator so that the vapor pressure is always below atmospheric pressure. The smaller machines using carbon tetrachloride, of which the vertical machine described may be considered an example, are preferably operated with a vacuum in the condenser as well as in the evaporator, but the larger machines, for instance of 100 tons or more capacity, in which the use of ethyl chloride is considered preferable, as before stated, are operated with a vacuum in the evaporator but a slight pressure above the atmosphere in the condenser. In the latter systems, an evaporator, such for instance, as disclosed in my application, Serial Number 441,876, filed February 2, 1921, and having submerged tubes or heat-transmitting surfaces, can be used.

The stuffing box H' for the centrifugal fan or compressor is preferably constructed as follows, see Figs. 15–21. The stuffing box casing which surrounds the compressor shaft 15, is preferably composed of separable halves or sections 70 and 71, each extending part way around the shaft, and an outer end plate or head 72 having a central opening through which the shaft passes. These parts or sections of the casing are bolted or otherwise tightly secured together and the casing is stationarily secured, as by bolts 74 to the pressure or discharge end of the casing of the compressor. Each of the joints between the parts of the stuffing box and between the stuffing box and the shell of the compressor is made gas tight, preferably by means of soft metal gaskets or packing strips 75 supplemented by a liquid seal. 76 represents a circular channel for the sealing liquid in the joint between the stuffing box and the compressor casing, and 76$^a$ represents a similar sealing channel in the joint between the head 72 and the two half sections of the stuffing box. These channels are connected by sealing channels 76$^b$ in the joints between the half sections 70 and 71 of the box, and sealing liquid is supplied to the channels from storage chambers 77 and 77$^a$ in the stuffing box through suitable connecting ducts 77$^b$ and 77$^c$. The stuffing box casing is provided with a vacuum chamber 78 surrounding the compressor shaft adjacent to the compressor casing, and this chamber is connected by a suitable pipe or conduit 78$^a$ with the suction end of the compressor or with one of the intermediate compressor stages so that a vacuum is maintained in the chamber 78 for the purpose of preventing condensation of the refrigerant vapor in the stuffing box between the compressor and the liquid seal, about to be described. The stuffing box is provided with an annular sealing chamber 79 surrounding the compressor shaft, and is also preferably provided on opposite sides of this sealing chamber with auxiliary annular chambers 80 and 81. Pressed on, or otherwise fixed by a gas tight joint to the compressor shaft, is an impeller sleeve 82 provided with annular flanges 83 and 84 and impeller blades 83$^a$ and 84$^a$ which project respectively into and are adapted to rotate in the chambers 80 and 81, and between these impellers with an annular flange 85 which projects into the sealing chamber 79 and is provided on its opposite sides with impeller blades 86 and 86$^a$ adapted to rotate in the sealing chamber. The impeller chamber 80 is connected to the sealing chamber 79 by one or more ducts 87 which extend inwardly from the outer portion of the chamber 80 and connect with the sealing chamber 79 between its ends, and the inner portion of the sealing chamber 79, at the opposite side of the sealing flange, is connected with the other impeller chamber 81 near its outer periphery by one or more ducts 81$^a$. A duct 87$^b$ connects the inner impeller chamber 80 with the vacuum chamber. Sealing liquid, which is supplied to the outer impeller chamber 81, as explained later, is pumped by the centrifugal action of the impellers in this chamber into the sealing chamber 79 and the impellers in the chamber 80 act to create a pressure which prevents the liquid from passing out of the sealing chamber into the chamber 80. A body of sealing liquid is thus held by centrifugal force in the outer peripheral portion of the sealing chamber 79, into which liquid projects the outer edge of the flange 85 in this chamber, thereby forming a liquid seal which prevents the passage of vapor or air through the shaft opening of the stuffing box either out of or into the compressor. The impellers in the chambers 80 and 81 at opposite sides of the sealing chamber supplement the impellers in the latter chamber in producing an effective liquid seal.

88 represents a valve or sleeve which surrounds the compressor shaft outwardly beyond the sleeve 82 and is adapted to slide lengthwise on the shaft into and out of contact with the end face of the sleeve 82. The adjacent ends of the valve 88 and the sleeve 82 are preferably of complementary frustoconical shape so as to form a tight joint when the valve seats against the end of the sleeve. The end of the sleeve 82 acts by a centrifugal force to impel sealing which is delivered to the space between the valve and the sleeve 82, through a duct 89 into the outer impeller chamber 81. An annular groove 90 is formed between the adjacent ends of the valve 88 and sleeve 82, preferably in the inner end of the valve, and sealing liquid is supplied from a suitable reservoir through a pipe 91 and duct 91$^a$ to this groove. The valve 88 is connected to the outer end of the stuffing box and held from turning, preferably by studs or bolts 92 which are screwed or otherwise suitably fixed to the head of the stuffing box and extend through perforated lugs on an outwardly projecting flange 93 on the valve. Springs 94 surrounding these bolts or studs between the lugs and the end of the stuffing box tend to open the valve or move it outwardly away from the end of the sleeve 82. 95 indicates an annular metal bellows or extensible sleeve which surrounds the adjacent ends of the sleeve 82 and the valve and is tightly secured at its opposite ends to the outer end of the stuffing box and to the outwardly projecting flange 93 of the valve. This extensible sleeve forms a gas and liquid tight chamber around the adjacent ends of the valve 88 and sleeve 82, whereby the sealing liquid is confined and the loss of vacuum or the entrance of air prevented while, nevertheless, permitting the opening and closing of the valve. Fibrous material or wicking 95ª is preferably provided in the cavities of the expansible sleeve 95 so that the sealing liquid will be absorbed by this material and retained in the sleeve, thus largely preventing the liquid from running out of the sleeve when the compressor is stopped.

The valve is adapted to be moved outwardly or opened and retained open while the compressor is running, and closed when the rotation of the compressor stops by an operating mechanism in the nature of a centrifugal governor. This device comprises a ring 96 which is fixed to the compressor shaft by screws 97 or other suitable fastenings, and a movable ring 98 which is adapted to slide endwise on the shaft, the movable ring being preferably connected to the shaft by means of a key or feather 99 working in a longitudinal groove 100 in the ring 98. The two rings 96 and 98 are connected by governor links 101 and 102 which are pivoted together at their adjacent ends, and at their outer ends are pivoted respectively to the fixed and sliding rings 96 and 98. The sliding ring 98 is provided with studs or fingers 103 which project into an annular groove 104 in the outer end of the valve sleeve 88 so that the valve is moved outwardly or inwardly by the corresponding movements of the ring 98. 105 indicates a coil spring surrounding the fixed and movable rings 96 and 98 and acting against shoulders thereon to press the movable ring 98 and the valve inwardly to close the valve. When the compressor is running, the centrifugal action of the governor links 101, 102 moves the ring 98 and the connected valve outwardly against the action of the closing spring 105. The small springs 94 surrounding the studs or bolts 92 are lighter than the valve closing spring 105 and do not prevent the valve from being closed by this spring when the compressor stops, but the springs 94 assist in opening the valve when starting up the compressor in case the valve sticks. The adjacent ends of the governor rings 96 and 98 are adapted to abut to limit the opening movement of the ring 98, and the opening movement of the valve 88 is limited by the engagement of its lugs with adjustable nuts or stops 106 on the studs 92. When the ring 98 and valve are thus arrested in their outer or open positions, there will be a clearance between the valve-opening fingers 103 and the faces of the groove 104 into which they extend so that there will be no friction between these parts when the valve is open and the compressor is running.

107 represents the reservoir for supplying the sealing liquid to the stuffing box. The reservoir can be of any suitable type, but it is preferably supported on an upright tube 108 secured to the stuffing box and connecting the reservoir with the storage chamber 77 in the stuffing box so that the latter is filled through the reservoir and tube. The reservoir is preferably provided with a gage glass 109 and with a sight feed valve 110 in the discharge pipe 91 which leads to the seat of the valve 88, so that the feed of the sealing liquid can be observed and regulated as required. A separate discharge pipe 111 with a sight feed or regulating valve 112 delivers the sealing liquid to the bore of the valve sleeve 88 to lubricate this valve. The feed pipes are preferably flexible or constructed so as not to interfere with the movement of the valve 88. 113 represents a liquid return duct leading from the first impeller chamber 81 and connecting with a pipe 114, preferably extending up through the supporting tube 108 into the reservoir with its upper end above the high level of the liquid in the reservoir. Any surplus sealing liquid, above the quantity utilized in forming the liquid seal in the sealing chamber 79, is returned through the pipe 114 to the reservoir by the impeller or centrifugal pump in the first impeller chamber 81. In this way a continuous supply of the sealing liquid, more than ample to make the seal, is continuously circulated through the extensible liquid chamber surrounding the valve seat and the connecting impeller chamber 81. Any suitable sealing liquid, such as glycerine, water or oil can be used. When the compressor is stopped, the closing of the valve 88 automatically stops the discharge of the sealing liquid and prevents waste thereof or its leakage into the compressor. The groove 90 in the end of the valve is fed with the sealing liquid when the valve is closed and forms a liquid seal supplementing the valve.

When the stuffing box is placed vertically, as in the vertical machine first described, an annular cup or chamber 115 (see Fig. 22) is used which surrounds the lower end of the impeller sleeve 82ª and has an inner tubular wall 116 which extends upwardly around the compressor shaft in an annular recess 117 in the impeller sleeve. When the compressor is stopped, the sealing liquid is adapted to run out of the impeller chambers 79, 80, and 81 and collect in this cup, which prevents the liquid from running into the compressor. This cup is connected by a pipe or passage 118 with the suction end of one of the compressor stages, and forms a vacuum chamber serving the same function as the vacuum chamber in the horizontally arranged stuffing box H'.

The stuffing box described provides a centrifugal liquid seal free from substantial friction when the compressor is running, and a valve or mechanical closure when the rotation of the compressor stops, and always insures a gas tight closure of the opening for the compression shaft. This stuffing box is applicable to high speed, rotary compressors, vacuum pumps or other rotary machines where it is necessary to prevent all leakage, either inwardly or outwardly around the machine shaft, and prevent friction. No claims for the stuffing box per se are made in this application, such claims being presented in a separate application.

I claim as my invention:

1. In a refrigerating system in which a volatile liquid refrigerant having a low vapor pressure and a high specific density is evaporated, compressed and condensed, the combination of an evaporator having evaporating surfaces over which the refrigerant flows and which surfaces are not submerged in the liquid refrigerant, a condenser for condensing the refrigerant vapor, a centrifugal compressor which delivers the refrigerant vapor from the evaporator to the condenser and maintains a relatively low difference of pressures in the evaporator and in the condenser, means for circulating a larger volume of liquid refrigerant through the evaporator than is evaporated therein and withdrawn therefrom by the compressor, and means for returning the liquefied refrigerant from the condenser and causing it to flow with said circulating liquid in thin films over the evaporating surfaces of the evaporator.

2. In a refrigerating system in which a volatile liquid refrigerant having a low vapor pressure and a high specific density is evaporated, compressed and condensed, the combination of an evaporator having evaporating surfaces over which the refrigerant flows and which surfaces are not submerged in the liquid refrigerant, a condenser for condensing the refrigerant vapor, a centrifugal compressor which delivers the refrigerant vapor from the evaporator to the condenser and maintains a relatively low difference of pressures in the evaporator and in the condenser, means for circulating a larger volume of liquid refrigerant through the evaporator than is evaporated therein and withdrawn by the compressor, means for evacuating air from the system to maintain a partial vacuum in at least a portion of the system, and regulating means for controlling the minimum temperature produced by the evaporator without changing the speed of the compressor.

3. In a refrigerating system in which a volatile liquid refrigerant having a low vapor pressure and a high specific density is evaporated, compressed and condensed, the combination of an evaporator having inner evaporating tubes through which the substance being cooled circulates, and surrounding outer tubes separated from the inner tubes by longitudinally enlarging spaces, said tubes not being submerged in the liquid refrigerant, a condenser for condensing the refrigerant vapor, a centrifugal compressor which delivers the refrigerant vapor from the evaporator to the condenser and maintains a relatively low difference of pressures in the evaporator and in the condenser, and means for returning the liquefied refrigerant from the condenser and causing it to flow in thin films through the spaces between said inner and outer tubes of the evaporator in the direction in which said spaces increase in size.

4. In a refrigerating system in which a volatile liquid refrigerant having a low vapor pressure and a high specific density is evaporated, compressed and condensed, the combination of an evaporator having vertical inner tubes and downwardly enlarging outer tubes with open lower ends surrounding the inner tubes and spaced therefrom, said tubes not being submerged in the liquid refrigerant, a condenser for condensing the refrigerant vapor, a centrifugal compressor which delivers the refrigerant vapor from the evaporator to the condenser and maintains a relatively low difference of pressures in the evaporator and in the condenser, and means for returning the liquefied refrigerant from the condenser and causing it to flow in thin films through the spaces between said inner and outer tubes of the evaporator.

5. In a refrigerating system in which a volatile liquid refrigerant having a low vapor pressure and a high specific density is evaporated, compressed and condensed, the combination of an evaporator having evaporating surfaces over which the refrigerant flows and which surfaces are not submerged in the liquid refrigerant, a condenser for condensing the refrigerant vapor, a centrifugal compressor which delivers the refrigerant vapor from the evaporator to the condenser and maintains a relatively low difference of pressures in the evaporator and in the condenser, means for returning the liquefied refrigerant from the condenser and causing the liquid to flow in thin films over the unsubmerged evaporating surfaces of the evaporator, and means operating automatically without changing the speed of the compressor for regulating the minimum temperature produced by the evaporator.

6. In a refrigerating system in which a volatile liquid refrigerant having a low vapor pressure and a high specific density is evaporated, compressed and condensed, the combination of an evaporator having evaporating surfaces over which the refrigerant flows and which surfaces are not submerged in the liquid refrigerant, a condenser for condensing the refrigerant vapor, a centrifugal compressor which delivers the refrigerant vapor from the evaporator to the condenser and maintains a relatively low difference of pressures in the evaporator and in the condenser, means for returning the liquefied refrigerant from the condenser and causing the liquid to flow in thin films over the unsubmerged evaporating surfaces of the evaporator, and means operating in response to temperature changes in the condenser and without changing the speed of the compressor for controlling the final condenser temperature.

7. In a refrigerating system in which a volatile liquid refrigerant having a low vapor pressure and a high specific density is evaporated, compressed and condensed, the combination of an evaporator having evaporating surfaces over which the refrigerant liquid flows and which surfaces are not submerged in the liquid refrigerant, a condenser for condensing the refrigerant vapor, a centrifugal compressor which delivers the refrigerant vapor from the evaporator to the condenser and maintains a relatively low difference of pressures in the evaporator and in the condenser, means for returning the liquefied refrigerant from the condenser and causing the liquid to flow in thin films over the unsubmerged evaporating surfaces of the evaporator, and automatic means for varying the supply of refrigerant liquid to the evaporator to regulate the refrigeration without changing the speed of the compressor.

8. In a refrigerating system in which a volatile liquid refrigerant having a low vapor pressure and a high specific density is evaporated, compressed and condensed, the combination of an evaporator having evaporating surfaces over which the refrigerant flows and which surfaces are not submerged in the liquid refrigerant, a condenser for condensing the refrigerant vapor, a centrifugal compressor which delivers the refrigerant vapor from the evaporator to the condenser and maintains a relatively low difference of pressures in the evaporator and in the condenser, means for returning the liquefied refrigerant from the condenser and causing it to flow in thin films over the evaporating surfaces of the evaporator, and means responsive to temperature changes in the evaporator and controlling the supply of refrigerant liquid to the evaporator independently of the speed of the compressor.

9. In a refrigerating system in which a volatile liquid refrigerant is employed, the combination of an evaporator having evaporating surfaces over which the liquid refrigerant flows for vaporizing the liquid refrigerant, a condenser including means for condensing the refrigerant vapor, a centrifugal compressor which delivers the refrigerant vapor from the evaporator to the condenser and maintains a relatively low difference of pressures in the evaporator and in the condenser, means for circulating a larger volume of liquid refrigerant through the evaporator than is evaporated therein and withdrawn therefrom by the compressor, means for returning the liquefied refrigerant from the condenser to flow with said circulating liquid over the evaporating surfaces of the evaporator, thermostatic means responsive to temperature changes in the condenser and controlling the final condenser temperature, and thermostatic means responsive to temperature changes in the evaporator and controlling the supply of refrigerant liquid to the evaporator independently of the speed of the compressor.

10. In a refrigerating system in which a volatile liquid refrigerant is employed, the combination of an evaporator in which the refrigerant liquid is vaporized by heat abstracted from the substance being cooled, a condenser including means for condensing the refrigerant vapor, a centrifugal compressor which delivers the refrigerant vapor from the evaporator to the condenser and maintains a relatively low difference of pressures in the evaporator and in the condenser, means for returning the liquefied refrigerant from the condenser to the evaporator, a thermostat influenced by the temperature of the substance being cooled, and means controlled thereby independently of the speed of the compressor for regulating the supply of refrigerant liquid to the evaporator.

11. In a refrigerating system in which a volatile liquid refrigerant is employed, the combination of an evaporator having evaporating surfaces over which the liquid refrigerant flows for vaporizing the refrigerant, a condenser including means for condensing the refrigerant vapor, a centrifugal compressor which delivers the refrigerant vapor from the evaporator to the condenser and maintains a relatively low difference of pressures in the evaporator and in the condenser, means for circulating a larger volume of liquid refrigerant through the evaporator than is evaporated therein and withdrawn therefrom by the compressor, means for returning the liquefied refrigerant from the condenser to flow with said circulating liquid over the evaporating surfaces of the evaporator, a thermostat influenced by the temperature of the substance being cooled, means controlled thereby for regulating the supply of refrigerant liquid to the evaporator independently of the speed of the compressor, and thermostatic means responsive to temperature changes in the condenser and controlling the final condenser temperature.

12. In a refrigerating system in which a volatile liquid refrigerant having a low vapor pressure and a high specific density is evaporated, compressed and condensed, the combination of an evaporator having evaporating surfaces over which the liquid refrigerant flows for vaporizing the refrigerant, a condenser for condensing the refrigerant vapor, a centrifugal compressor which delivers the refrigerant vapor from the evaporator to the condenser and maintains a substantially constant relatively low difference of pressures in the evaporator and in the condenser, means for circulating a larger volume of liquid refrigerant through the evaporator than is evaporated therein and withdrawn therefrom by the compressor, means for returning the liquefied refrigerant from the condenser to flow with said circulating liquid over the evaporating surfaces of the evaporator, and means for regulating the quantity of liquid refrigerant returned to the evaporator to control the refrigeration.

13. In a refrigerating system in which a volatile liquid refrigerant is employed, the combination of an evaporator including means for vaporizing the liquid refrigerant, a condenser including means for condensing the refrigerant vapor, a centrifugal compressor which withdraws the refrigerant vapor from the evaporator and delivers it at a higher pressure to the condenser, a rotary pump for returning the liquefied refrigerant from the condenser to the evaporator, said parts being enclosed in a casing with said compressor and pump arranged respectively above and below the evaporator and connected by a vertical shaft, and driving means for the compressor and pump connected to the upper end of said shaft.

14. In a refrigerating system in which a volatile liquid refrigerant is employed, the combination of an evaporator including means for vaporizing the liquid refrigerant, a condenser including means for condensing the refrigerant vapor, a centrifugal compressor which withdraws the refrigerant vapor from the evaporator and delivers it at a higher pressure to the condenser, a rotary pump for delivering the liquefied refrigerant from the condenser to the evaporator, said parts being enclosed in a casing with said compressor and pump arranged respectively above and below the evaporator and connected by a vertical shaft and driving means for the compressor and pump shaft, and the condenser arranged annularly around the compressor.

15. The herein described method of refrigeration which comprises the following steps, circulating a body of volatile liquid refrigerant having a low vapor pressure and a high specific density, vaporizing a portion of said circulating liquid while it is flowing in unsubmerged thin streams, compressing the vaporized refrigerant by centrifugal action so as to maintain a relatively low difference between the evaporating and condensing pressures of the vapor, condensing the compressed vapor and returning the condensate to said circulating body of liquid, said refrigerant being isolated from other fluid media during the compressing and condensing thereof, and regulating the refrigerating capacity by controlling the flow of one of the heat carriers employed in the method.

16. The herein described method of refrigeration which comprises the following steps, circulating a body of volatile liquid refrigerant having a low vapor pressure and a high specific density, vaporizing a portion of said circulating liquid while it is flowing in unsubmerged thin streams, compressing the vaporized refrigerant by centrifugal action so as to maintain a relatively low difference between the evaporating and condensing pressures of the vapor, condensing the compressed vapor and returning the condensate to said circulating body of liquid, said refrigerant being isolated from other fluid media during the compressing and condensing thereof, and regulating the refrigerating capacity by controlling the quantity of liquid which is vaporized.

17. The herein described method of refrigeration which comprises the following steps, circulating a body of volatile liquid refrigerant having a low vapor pressure and a high specific density, vaporizing a portion of said circulating liquid while it is flowing in unsubmerged thin streams, compressing the vaporized refrigerant by centrifugal action so as to maintain a relatively low difference between the evaporating and condensing pressures of the vapor, condensing the compressed vapor and returning the condensate to said circulating body of liquid, said refrigerant being isolated from other fluid media during the compressing and condensing thereof, and regulating the refrigerating capacity by controlling the flow of the condensing medium and of the refrigerant being vaporized.

18. The herein described method of refrigeration which comprises the following steps, circulating a body of volatile liquid refrigerant having a low vapor pressure and a high specific density, vaporizing a portion of said circulating liquid while it is flowing in unsubmerged thin streams, compressing the vaporized refrigerant by centrifugal action so as to maintain a relatively low difference between the evaporating and condensing pressures of the vapor, condensing the compressed vapor and returning the condensate to said circulating body of liquid, said refrigerant being isolated from other fluid media during the compressing and condensing thereof, and regulating the quantity of liquid refrigerant vaporized under the control of the temperature of the substance being cooled.

WILLIS H. CARRIER.